United States Patent [19]

Umetani et al.

[11] Patent Number: 4,598,203

[45] Date of Patent: Jul. 1, 1986

[54] MULTIELEMENT RADIATION DETECTOR

[75] Inventors: Keiji Umetani, Kokubunji; Atsushi Suzuki, Higashiyamato; Manabu Nakagawa, Sagamiko; Minoru Yoshida, Hinode; Fumio Kawaguchi, Hachiouji; Hiromichi Yamada, Hino; Kouichi Koike, Kashiwa, all of Japan

[73] Assignees: Hitachi, Ltd.; Hitachi Medical Corporation, both of Tokyo, Japan

[21] Appl. No.: 663,945

[22] Filed: Oct. 23, 1984

[30] Foreign Application Priority Data

Oct. 24, 1983 [JP] Japan .................................. 58-198751

[51] Int. Cl.$^4$ ........................... G01T 1/20; G01T 1/16
[52] U.S. Cl. ................................. 250/366; 250/370; 378/19
[58] Field of Search ............... 250/366, 370 I, 370 G, 250/367; 378/19

[56] References Cited

U.S. PATENT DOCUMENTS

| 4,153,839 | 5/1979 | Hounsfield et al. | 378/19 |
| 4,159,424 | 6/1979 | Kingsley | 250/483.1 |
| 4,187,427 | 2/1980 | Cusano | 250/366 |
| 4,492,869 | 1/1985 | Suzuki et al. | 250/367 |

Primary Examiner—Alfred E. Smith
Assistant Examiner—Constantine Hannaher
Attorney, Agent, or Firm—Antonelli, Terry & Wands

[57] ABSTRACT

A multielement radiation detector in which many elements are arranged in array. Each element includes a scintillator which is tilted with respect to the incident direction of radiant rays, and a silicon photodiode which is opposed to the plane of incidence of the scintillator. The light-receiving plane of the silicon photodiode is tilted to meet the inclination of the scintillator. Therefore, the gradient of detection sensitivity distribution is reduced in the thickness direction of the detectors.

8 Claims, 4 Drawing Figures

MULTIELEMENT RADIATION DETECTOR

FIELD OF THE INVENTION

The present invention relates to a radiation detector, and particularly to a scintillation radiation detector which is used for an X-ray computed tomography and the like.

BACKGROUND OF THE INVENTION

In the X-ray computed tomography, use is made of a multielement radiation detector consisting of a plurality of radiation detector elements that are arranged on an arc, in order to irradiate a material to be inspected with a fan-shaped beam of X-rays thereby to measure the distribution of X-ray absorption factors. As the above-mentioned multielement radiation detector, there has been known an ionization chamber type detector utilizing the ionization function of a gas, a semiconductor detector utilizing the ionization function of a solid material, and a scintillation detector utilizing the fluorescent function relying upon X-rays.

In the scintillation detector, use has generally been made of a single crystal inorganic scintillator, such as NaI, CsI, $CdWO_4$, $Bi_4Ge_3O_{12}$, or the like. These scintillators have their merits and demerits in their characteristics, and are not utilizable for the computed tomographies of all types. To compensate the single crystalline scintillator for the above-mentioned defect, there has been used a powder scintillator which is molded by using a suitable binder such as a polystyrene resin or the like.

The powder scintillator has a smaller transmission coefficient of light than the single crystal scintillator. Therefore, it is difficult to take out the rays from the outgoing side and to receive the rays using a light detector. Therefore, the structure adapted to the radiation detector employing powder scintillator consists of receiving, using a light detector, the light from the incident side of the powder scintillator. The detector of this structure has already been proposed in the U.S. Pat. No. 4, 187,427. In this detector, however, the scintillator is aslantly disposed with respect to the incident direction of X-rays, and the light detector is disposed at a position off the X-ray incident path in parallel with the incident direction of X-rays. Therefore, the sensitivity for detecting the X-rays has gradient relative to the thickness direction of the incident beam of X-rays.

In the X-ray computed tomography, on the other hand, difference in the sensitivity among the individual elements constituting the multielement detector gives rise to the occurrence of ring-like artifact in the picture. Therefore, electric calibration has been performed to substantially eliminate variance in sensitivity among the elements. The ring-like artifact can be prevented from occurring by the calibration only when the X-ray absorption factor of the material to be inspected is uniform in the thickness direction of the beam of X-rays. With the practical materials to be inspected, however, the X-ray absorption factor is not uniform in the thickness direction of the beam of X-rays. Furthermore, if the individual elements have gradient in sensitivity in the thickness direction of the beam of X-rays, it becomes difficult to effect the calibration to match the practical imaging operation. Variance in sensitivity develops among the individual elements due to the gradient in sensitivity. Therefore, ring-like artifact develops on the reproduced picture.

SUMMARY OF THE INVENTION

The object of the present invention is to provide a multielement radiation detector in which the individual elements reduce the gradient in sensitivity in the thickness direction of incident beam, i.e., in the direction at right angles with a direction in which the elements are arrayed, so that there will not develop variance in sensitivity among the elements that cannot be prevented from occurring by the calibration.

According to a characteristic structure of the present invention, each of the elements constituting a multielement radiation detector has a scintillator of which the plane of incidence is obliquely arranged with respect to the incident direction of rays, and a light detector of which the light-receiving plane is obliquely arranged with respect to the incident direction of rays so as to be opposed to the plane of incidence of the scintillator.

With the above-mentioned structure, the angle for viewing the light detector from each of the points on the plane of incidence of the scintillator of each of the elements and the distance up to the light detector, do not become so asymmetrical regardless of the right or left side of the scintillator. Therefore, the gradient of sensitivity reduces in the thickness direction of the beam of X-rays, i.e., in the direction at right angles with the direction in which the elements are arranged. Therefore, variance in sensitivity can be eliminated among the elements by calibrating the sensitivity of elements by directly projecting the beam of X-rays thereto without passing through the material that is to be inspected and, hence, it is possible to prevent ring-like artifact from developing on the picture of the X-ray computed tomography

DESCRIPTION OF THE PREFERRED EMBODIMENT

Figure 1:
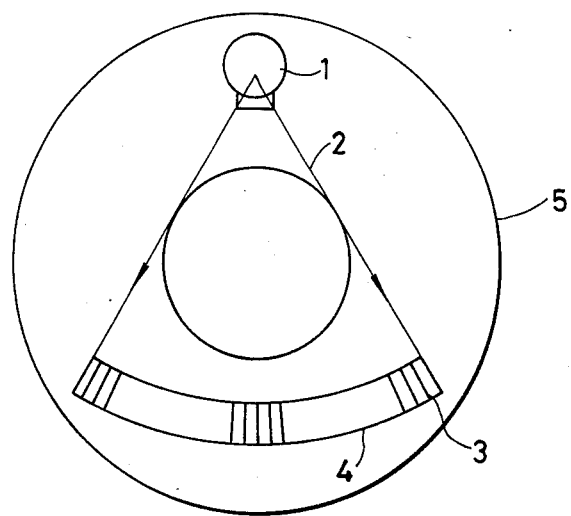
FIG. 1 is a diagram which schematically illustrates the structure of an X-ray computed tomography.

FIG. 1 illustrates the structure of an X-ray computed tomograph to which the present invention is adapted. A rotary disc 5 is provided with an X-ray source 1 which generates X-rays 2 in the form of a fan, and a multielement X-ray detector 4. The multielement X-ray detector consists of 30 to 2000 elements that are arranged to constitute a portion of an arc. The individual elements detect the intensity distribution of the beam of X-rays which has passed through a material to be inspected that is placed in the central cavity of the disc 5. The detection is repeated while rotating the disc 5 to gain the data for obtaining a tomogram that represents the distribution of X-ray absorption factors of the cross section of the material that is being inspected.

Figure 2:
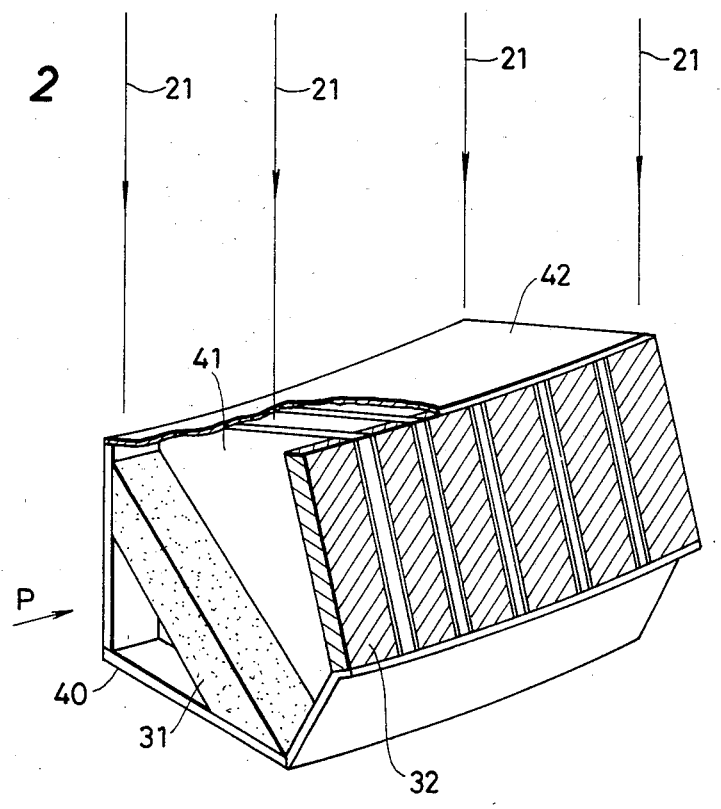
FIG. 2 is a perspective view showing the structure of a multielement X-ray detector according to an embodiment of the present invention.

FIG. 2 shows a portion of the multielement detector 4. A detector case 40 is divided by collimators 41 into individual elements. Aluminum is vaporized onto the surfaces of the collimators in order to increase the reflection factor of light and, hence, to increase the sensitivity. Each element consists of a powder scintillator 31 which is so disposed that the plane of incidence of X-rays is inclined with respect to the incident direction of X-rays, and a silicon photodiode 32 which is opposed thereto. The beam of X-rays falls from the upper direction in the drawing as indicated by lines 21, passes through a front wall 42 consisting of an aluminum plate or the like, and reaches the scintillators 31. The light of scintillation thus produced is then converted into electric signals by the silicon photodiodes.

Figure 3:
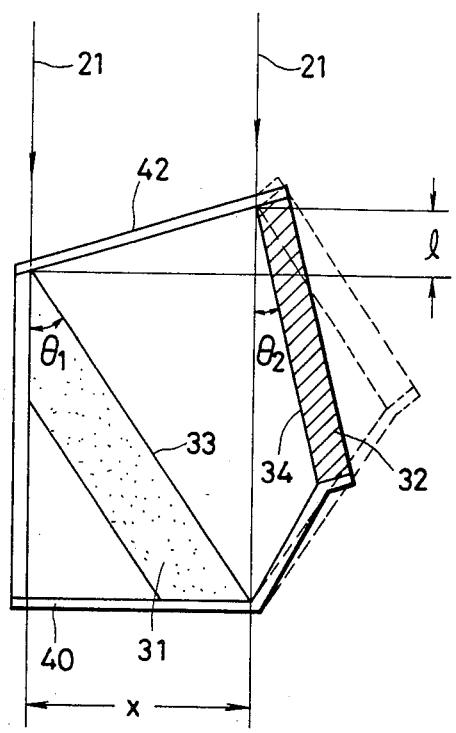
FIG. 3 is a section view showing the detector of FIG. 2.

FIG. 3 is a sectional view of the detector of FIG. 2 which is cut along a plane perpendicular to the direction in which the elements are arrayed as indicated by arrow P in FIG. 2. As shown in FIG. 3, the plan 33 of incidence of X-rays of the scintillator 31 is tilted by $\theta_1$ with respect to the incident direction of the X-rays. On the other hand, the light-receiving plane 34 of the silicon photodiode 32 is tilted by $\theta_2$, and is disposed at a position which is upwardly shifted by l from the upper end of the scintillator 31 so as to be opposed to the front surface of the scintillator 31.

Figure 4:
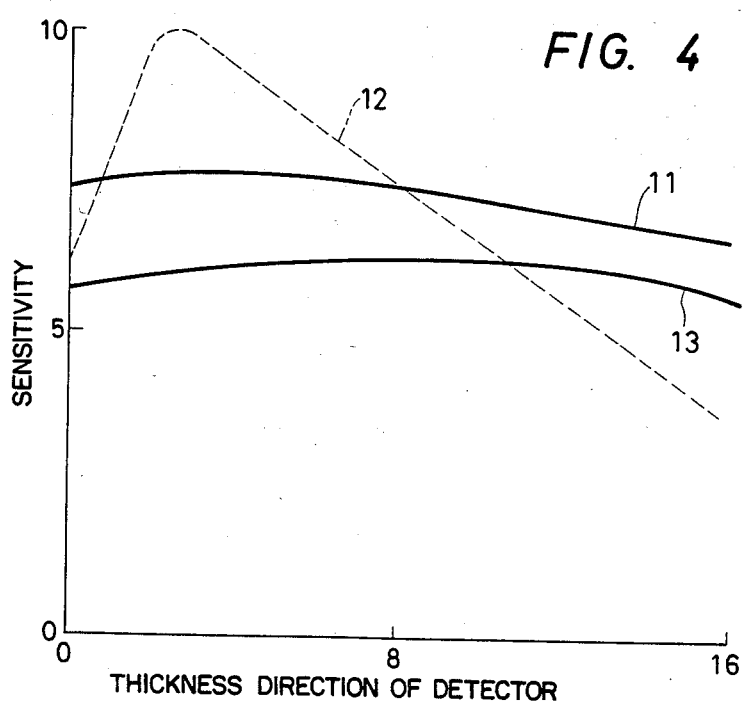
FIG. 4 is a graph showing the characteristics of the embodiment.

FIG. 4 shows the distribution of sensitivity relative to the thickness direction of incident beam of X-rays of the above-mentioned embodiment in comparison with the conventional example. A characteristic curve 11 represents the case when a width x of incidence of the detector is 16 mm, an angle $\theta_1$ is 34.8° defined by the plane 33 of incidence of the scintillator 31 and the incident direction of X-rays, an angle $\theta_2$ is 15° defined by the light-receiving plane 34 of the silicon photodiode 32 and the incident direction of X-rays, and the distance l is 9 mm. It will be understood that the gradient with respect to the thickness direction of the detector is reduced and nearly a uniform sensitivity distribution is obtained over the whole range compared with characteristic curve 12 of distribution that represents the case when the angle $\theta_2$ is set to 0°, i.e., when the light-receiving plane of the silicon photodiode is disposed in parallel with the incident direction of X-rays.

The characteristic curve 13 represents the sensitivity distribution of the case when $\theta_2=34.8°$, i.e., when the plane of incidence of the scintillator 31 is in parallel with the light-receiving plane of the silicon photodiode as indicated by broken lines in FIG. 3. In this case, the sensitivity distribution becomes symmetrical with respect to the right and left sides; i.e., an ideal distribution is obtained. However, since the distance increases between the silicon photodiode and the scintillator, the sensitivity as a whole decreases compared with the case of when $\theta=15°$.

By employing the multielement detector consisting of elements with uniform sensitivity distribution for the X-ray computed tomography, as mentioned above, there develops no variance in sensitivity among the elements even when the imaging operation is effected for a material that exhibits large change in the X-ray absorption factor in the thickness direction of the beam of X-rays, such as apex portions of a head. Therefore, there does not develop ring-like artifact on the picture. Furthermore, even when the imaging operation is carried out by changing the thickness of the beam of X-rays, it is allowed to permit the X-rays incident upon any position of the detectors, presenting great practical advantage.

Although the above-mentioned embodiment has dealt with the case where the powder scintillator was used as the scintillator 31, it is also allowable to use a single crystal scintillator as the scintillator 31 instead of the powder scintillator.

We claim:

1. A multielement radiation detector comprising a plurality of elements that are isolated from each other by collimators and that are arranged in array, wherein each of the elements includes a scintillator having a plane of incidence tilted with respect to the direction of the incident radiant rays, the plane of incidence having one side on which the radiant rays are incident and through which scintillated lights are radiated and a light detector having a light-receiving plane which is disposed at a position to oppose to said one side of the plane of incidence of said scintillator, the light-receiving plane being tilted with respect to the direction of the incident radiant rays.

2. A multielement radiation detection according to claim 1, wherein said light-detectors are arranged at positions closer to the source of radiant rays than said scintillators.

3. A multielement radiation detector according to claim 1, wherein the angle delimited between the light-receiving plane of said light detector and the direction of incident radiant rays is smaller than the angle delimited between the plane of incidence of said scintillator and the direction of incident radiant rays.

4. A multielement radiation detector according to claim 1, wherein the light-receiving plane of said light detector and the plane of incidence of said scintillator are in parallel with each other.

5. A multielement radiation detector for detecting X-rays radiated from an X-ray source and spread along a first plane into a form of a fan beam, the multielement radiation detector comprising a plurality of elements that are optically isolated from each other and arranged in an array along said first plane, each of the elements including a scintillator having a plane of incidence of X-rays facing one side of side first plane and being inclined with respect to said first plane so that an upper edge of the plane of incidence of said scintillator is closer to the X-ray source than the lower edge thereof and the lower edge of the plane of incidence of said scintillator is closer to said first plane than the upper edge thereof, the plane of incidence of said scintillator having one side on which the X-rays are incident and through which scintillated lights are radiated toward the one side of said first plane, and a light detector having a light-receiving plane disposed at a position to oppose the one side of the plane of incidence of said scintillator for receiving the scintillated lights of said scintillator radiated through the one side of the plane of incidence of said scintillator, the light-receiving plane of said light detector being inclined with respect to said first plane and facing another side of said first plane so that an upper edge of the light-receiving plane is closer to the X-ray source than a lower edge thereof and the upper edge of the light receiving plane is closer to said first plane than the lower edge thereof.

6. A multielement radiation detector according to claim 5, wherein the upper edge of the light-receiving plane of said light detector is closer to the X-ray source than the upper edge of the plane of incidence of said scintillator.

7. A multielement radiation detector according to claim 5, wherein an angle delimited between the light-receiving plane of said light detector and the direction of incident X-rays from the X-ray source is smaller than an angle delimited between the plane of incidence of said scintillator and the direction of incident X-rays from the X-ray source.

8. A multielement radiation detector according to claim 5, wherein the light-receiving plane of said light detector and the plane of incidence of said scintillator are in parallel with each other.

* * * * *